(12) United States Patent
Lee

(10) Patent No.: US 9,213,149 B2
(45) Date of Patent: Dec. 15, 2015

(54) CLEANING DEVICE

(71) Applicant: HON HAI PRECISION INDUSTRY CO., LTD., New Taipei (TW)

(72) Inventor: Bing-Heng Lee, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 14/515,707

(22) Filed: Oct. 16, 2014

(65) Prior Publication Data
US 2015/0107036 A1 Apr. 23, 2015

(30) Foreign Application Priority Data

Oct. 18, 2013 (TW) ............................. 102137625 A

(51) Int. Cl.
*G02B 6/38* (2006.01)
*A46B 13/08* (2006.01)
*B08B 1/00* (2006.01)

(52) U.S. Cl.
CPC .............. *G02B 6/3866* (2013.01); *A46B 13/08* (2013.01); *B08B 1/00* (2013.01); *G02B 6/38* (2013.01)

(58) Field of Classification Search
CPC ........ G02B 6/3866; G02B 6/38; A46B 13/08; B08B 1/00

USPC .................... 15/97.1, 210.1, 228, 231, 25, 26
See application file for complete search history.

(56) References Cited

U.S. PATENT DOCUMENTS

| 5,490,898 | A | * | 2/1996 | Koyama ....................... 156/540 |
| 6,467,119 | B1 | * | 10/2002 | Van Meter et al. ............ 15/22.1 |
| 8,985,864 | B2 | * | 3/2015 | Ott ................................. 385/72 |
| 2004/0148719 | A1 | * | 8/2004 | Lychwick ...................... 15/97.1 |
| 2006/0191091 | A1 | * | 8/2006 | Kida ........................... 15/210.1 |
| 2007/0023067 | A1 | * | 2/2007 | Kida et al. ........................ 134/6 |
| 2011/0047731 | A1 | * | 3/2011 | Sugita et al. ................... 15/97.1 |
| 2011/0072600 | A1 | * | 3/2011 | Nakane et al. ................. 15/97.1 |
| 2011/0154599 | A1 | * | 6/2011 | Nakane et al. ............... 15/210.1 |
| 2012/0017384 | A1 | * | 1/2012 | Fujiwara ....................... 15/97.1 |

* cited by examiner

*Primary Examiner* — Monica Carter
*Assistant Examiner* — Michael Jennings
(74) *Attorney, Agent, or Firm* — Novak Druce Connolly Bove + Quigg LLP

(57) ABSTRACT

A cleaning device includes a cleaning portion and a driving portion. One end of the cleaning portion includes a cleaning head configured to clean an object to be cleaned. A spiral shaped guide groove is defined in an outside surface of the cleaning head. The driving portion includes a protruding portion. The protruding portion is movably received in the spiral shaped guide groove. When the cleaning head is resisted to the object to be cleaned, and the driving portion moves toward the object to be cleaned, the protruding portion slides along the spiral shaped guide groove to drive the cleaning head to rotate to clean the object to be cleaned.

7 Claims, 4 Drawing Sheets

CLEANING DEVICE

CROSS-REFERENCE TO RELATED APPLICATIONS

This application claims priority to Taiwan Patent Application No. 102137625 filed on Oct. 18, 2013, the contents of which are incorporated by reference herein.

FIELD

The subject matter herein generally relates to cleaning devices, and particularly to a cleaning device for cleaning optical fiber connectors.

BACKGROUND

Optical fiber connectors need to be frequently cleaned because dirt may greatly affect the transmission effect of optical signals.

BRIEF DESCRIPTION OF THE DRAWINGS

Implementations of the present technology will now be described, by way of example only, with reference to the attached figures.

DETAILED DESCRIPTION

Figure 1:
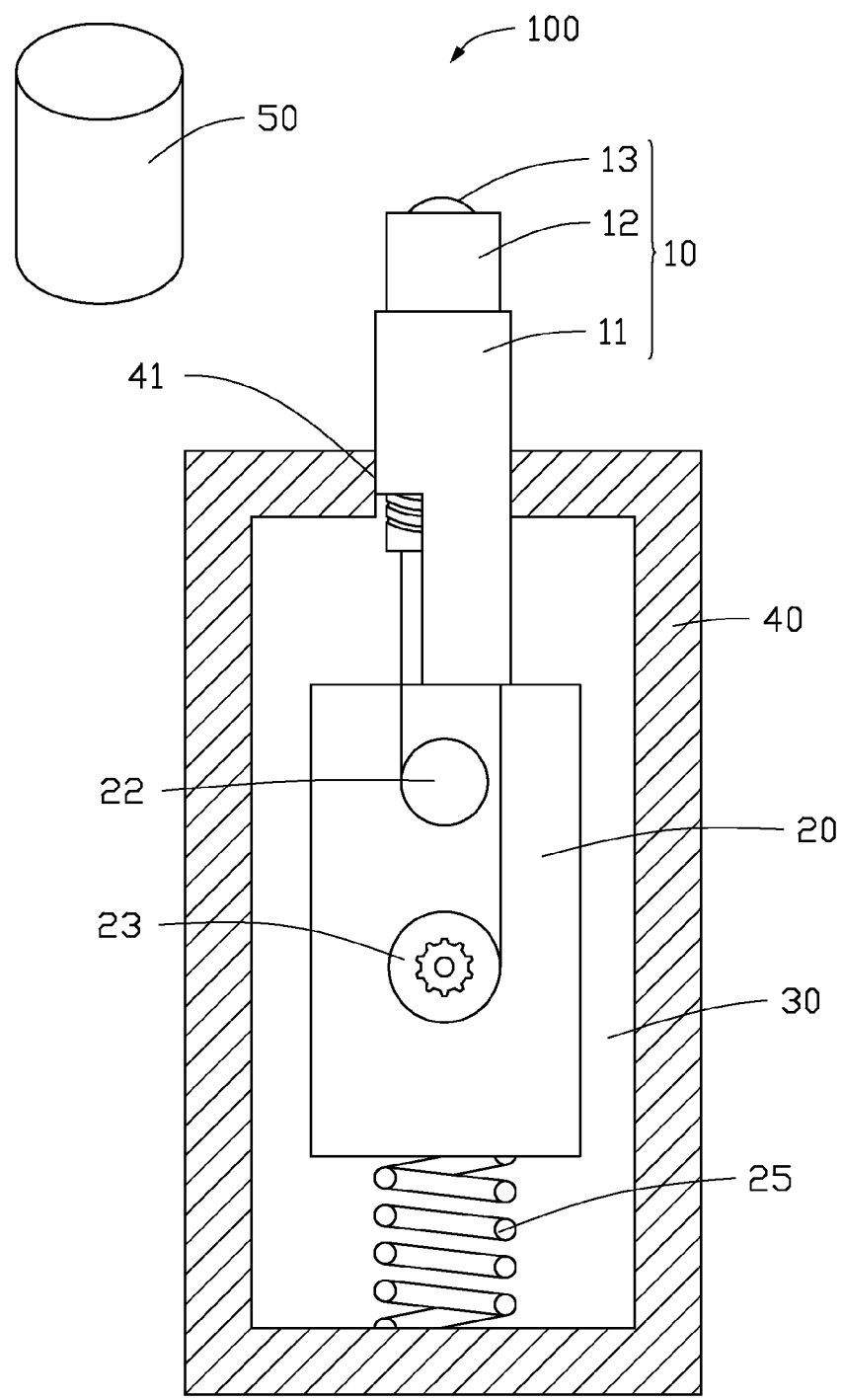
FIG. 1 is an cross-sectional view of an example embodiment of an optical fiber connector cleaning device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein, However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout disclosure will now be presented. The term "outside" refers to a region that is beyond the outermost confines of a physical object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to", it specifically indicates open-ended inclusion or membership in a so-described combination, group, series and the like.

FIG. 1 illustrates a cross-sectional view of an example embodiment of a cleaning device 100 for cleaning an optical fiber connector (not shown). In this embodiment, the cleaning device 100 can include a cleaning portion 10, a winding portion 20, a driving portion 30, and a casing 40. The casing 40 is hollow, the cleaning portion 10, the winding portion 20, and the driving portion 30 are received in the casing 40. The cleaning portion 10 includes a cleaning head 12. One end of the casing 40 defines a hole 41, the cleaning head 12 of the cleaning portion 10 extends out of the casing 40 through the hole 41. The cleaning head 12 cleans the optical fiber connector using a cleaning line 13. The driving portion 30 is configured to drive the cleaning head 12 to rotate, the winding portion 20 is configured to transmit the cleaning line 13. In this embodiment, the winding portion 20 transmits the cleaning line 13 by moving the cleaning line 13 along a length direction of the cleaning line 13. It can be understood that, in FIG. 1, only a part of elements of the winding portion 20 and the driving portion 30 are represented. More elements of the winding portion 20 and the driving portion 30 will be represented in FIG. 3 and FIG. 4.

Figure 2:
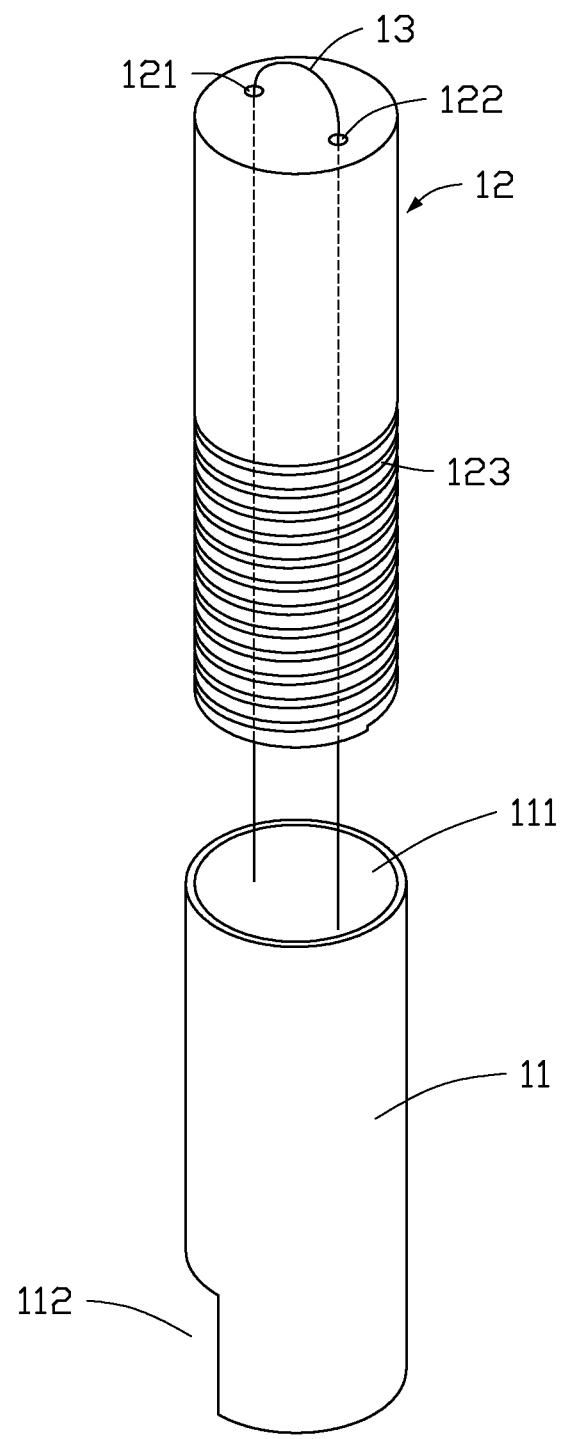
FIG. 2 is an exploded view of an example embodiment of the optical fiber connector cleaning device of FIG. 1.

Referring to FIG. 2, the cleaning portion 10 can include a sleeve 11, the cleaning head 12, and the cleaning line 13. In at least one embodiment, the sleeve 11 can be substantially a hollow cylinder, and the sleeve 11 can extend out of the hole 41. A first through hole 111 is formed in the sleeve 11 along an axis direction of the sleeve 11. An opening 112 is defined in the bottom of the sidewall of the sleeve 11. The cleaning head 12 is received in the first through hole 111, and is rotationally connected to the sleeve 11. In this embodiment, the cleaning head 12 can be substantially cylindrically shaped. In at least one embodiment, a second through hole 121 and a third through hole 122 are substantially parallelly defined in the cleaning head 12 along an axis direction of the cleaning head 12. A spiral shaped guide groove 123 is defined along the outside surface of the cleaning head 12. When the cleaning head 12 is received in the first through hole 111, a part of the spiral shaped guide groove 123 faces to the opening 112 and is exposed from the sleeve 11. In this embodiment, the length of the cleaning head 12 is longer than the length of the sleeve 11.

In this embodiment, two ends of the cleaning line 13 are respectively inserted into the top end of the second through hole 121 and the top end of the third through hole 122, and the two ends of the cleaning line 13 then respectively extend out from the bottom end of the second through hole 121 and the bottom end off the third through hole 122. When the cleaning head 12 is resisted to the optical fiber connector, the cleaning portion 10 cleans the optical fiber connector using a section of the cleaning line 13 between the top end of the second through hole 121 and the top end of the third through hole 122. In other embodiments, the second through hole 121 and the third through hole 122 can be replaced by one single annular through hole (not shown), the two ends of the cleaning line 13 can be inserted into a top end of the annular through hole and extend out from a bottom end of the annular through hole.

Figure 3:
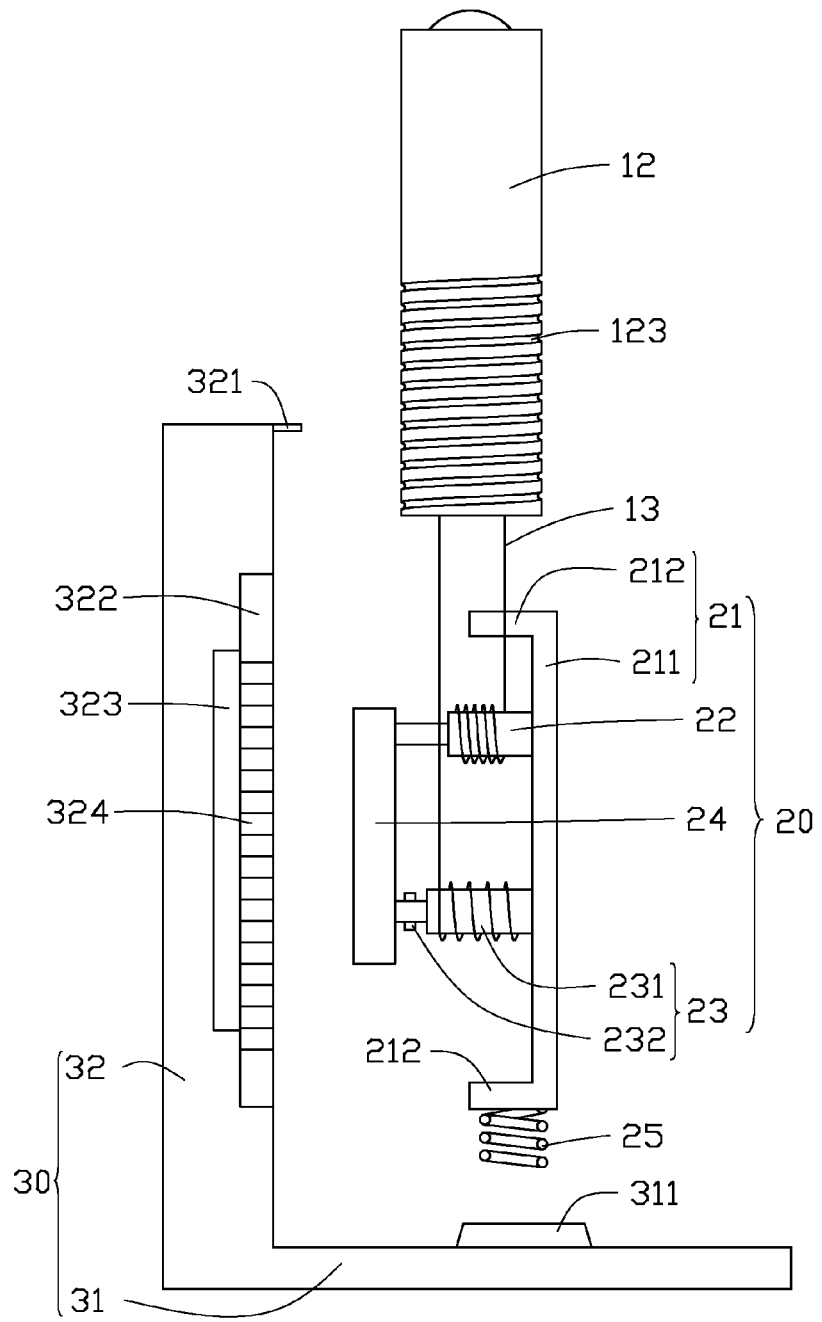
FIG. 3 is a cross-sectional view of an example of a cleaning head, a winding portion, and a driving portion of the optical fiber connector cleaning device of FIG. 1.

Referring to FIG. 3, the winding portion 20 can include a support member 21, a first winding member 22, a second winding member 23, a fixing member 24, and an elastic member 25. The support 21 can include a vertical member 211 and two horizontal members 212. The two horizontal members 212 are respectively connected to the two ends of the vertical member 211. In this embodiment, the bottom of the sleeve 11 is fixed to the top horizontal member 212. Thus the winding portion 20 is connected to the cleaning portion 10.

The first winding member 22 and the second winding member 23 are rotatably connected to one side of the vertical member 211. In at least one embodiment, the first winding member 22 and the second winding member 23 are substantially cylindrically shaped. The two ends of the cleaning line 13 extend out of the second through hole 121 and the third through hole 122 are respectively wound on the first winding member 22 and the second winding member 23. When the first winding member 22 and the second winding member 23 rotate, the cleaning line 13 can be wound tightly or be released.

In this embodiment, the second winding member 23 can include a rod 231 and a gear 232. One end of the cleaning line 13 can be wound on the rod 231. The rod 231 is connected between the vertical member 211 and the gear 232. When the gear 232 rotates, the gear 232 drives the rod 231 to rotate to cause the cleaning line 13 to move to wind on the rod 231, at the same time, the moving cleaning line 13 drives the first winding member 22 to rotate to release another end of cleaning line 13 which is wound on the first winding member 22. Thus, the cleaning line 13 is transmitted. The fixing member 24 is connected to the first winding member 22 and the gear 232. A first end of the elastic member 25 can be connected to the bottom horizontal portion 212.

Figure 4:
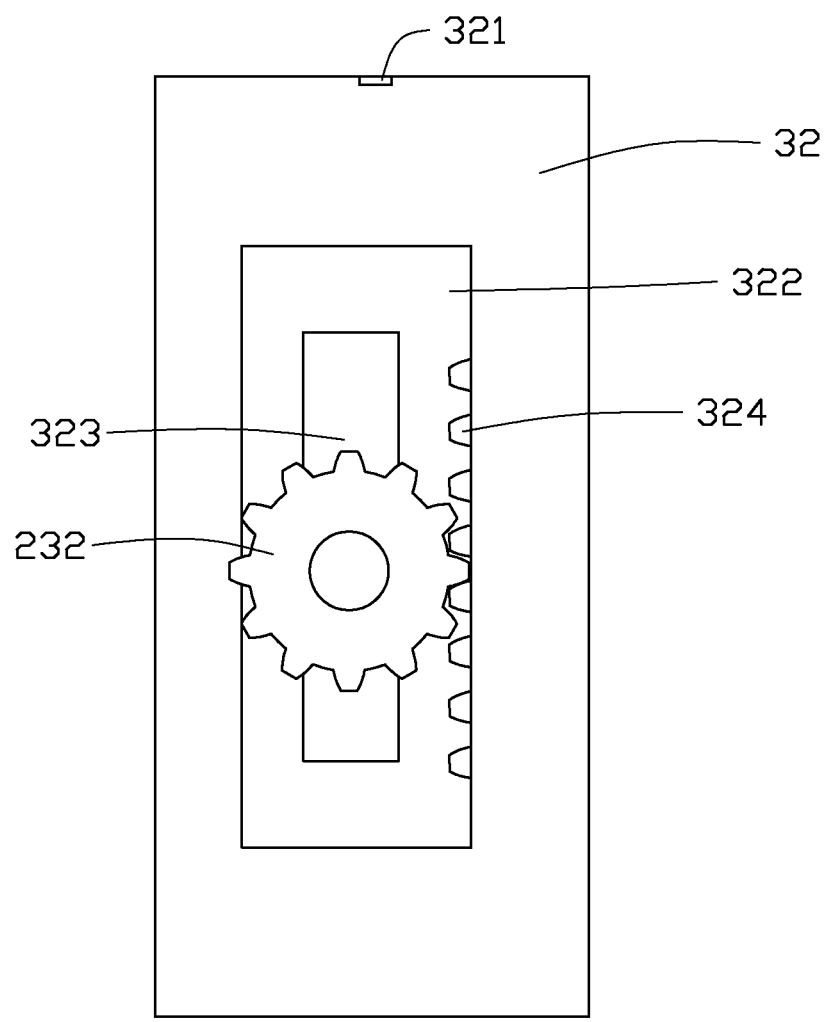
FIG. 4 is an isometric view of an example of a positional relation between gears of the winding portion and the driving portion of FIG. 3.

Further referring to FIG. 4, the driving portion 30 can include a base 31 and a plate 32 vertically connected to the base 31. The base 31 is fixed to the bottom of the casing 40. The base 31 defines a connection portion 311, a second end of the elastic member 25 can be connected to the connection portion 311. A protruding portion 321 projects from a top end of the plate 32, wherein the top end of the plate 32 is away from the base 31. The protruding portion 321 can be inserted into the opening 112 and can be received in the spiral shaped guide groove 123. When a user utilizes the cleaning device 100 to clean the optical fiber connector, the user can put the cleaning head 12 to a position resisting to the optical fiber connector and then push the casing 40 to move toward the optical fiber connector, the driving portion 30 moves toward the clean head 12 while the protruding portion 321 is driven by the casing 40 to move along the spiral shaped guide groove 123, thus, the cleaning head 12 can be driven to rotate to clean the optical fiber connector using the portion of the cleaning line 13 extending out from the cleaning head 12. When the casing 40 moves toward the optical fiber connector, the elastic member 25 is compressed. If the user pulls the casing 40 away from the optical fiber connector, the restoring force of the elastic member 25 drives the winding portion 20 and the cleaning portion 10 to move in a direction opposite to the direction that the driving portion 30 previously moves, thus, the protruding portion 321 moves back along the spiral shaped guide groove 123 to an initial position. Therefore, the two ends of the cleaning line 13 cannot be intertwined due to the rotation of the cleaning head 12.

The plate 32 further defines a first guide groove 322. A second guide groove 323 is defined in the first guide groove 322. The fixing member 24 of the winding portion 20 is received in the second guide groove 323, and the fixing member 24 can slide along the second guide groove 323. The gear 232 is received in the first guide groove 322 and can slide along the first guide groove 322.

Referring to FIG. 4, at least one sidewall of the first guide groove 322 defines a number of engaging teeth 324, the engaging teeth 324 engage with the gear 232. When the clean head 12 resists the optical fiber connector, and the driving portion 30 is pushed by the user to move toward the optical fiber connector, the elastic member 25 is compressed, and the engaging teeth 324 move relative to the gear 232, that is, the engaging teeth 324 drive the gear 232 to rotate. The gear 232 further drives the rod 231 to rotate when being rotated, thus one end of the cleaning line 13 is rewound to the rod 231, and another end of the cleaning line 13 is released from the first winding member 22. Therefore, the section of the cleaning line 13 used to clean the optical fiber connector can be driven to transmit.

When using the clean device 100 to clean the optical fiber connector, the user can first resist the clean head 12 to the optical fiber connector and then pushes the casing 40 to move toward the optical fiber connector, thus the protruding portion 321 slides along the spiral shaped guide groove 123 to drive the clean head 12 to rotate, the cleaning line 13 wound on the clean head 12 also rotates to clean the optical fiber connector. Meanwhile, when the driving portion 30 moves toward the optical fiber connector along with the casing 40, the elastic member 25 is compressed, and the engaging teeth 324 drives the gear 232 to rotate. The gear 232 rotates to drive the rod 231 to rotate to wind one end of the cleaning line 13. Thus the section of the cleaning line 13 used to clean the optical fiber connector can be driven to transmit and can be refreshed. That is, when the cleaning head 12 is rotated to clean the optical fiber connector by using the cleaning line 13, the section of the cleaning line 13 used to clean the optical fiber connector can be refreshed due to the cleaning line 13 is moved through the second through hole 121 and the third through hole 122. When the cleaning action is finished, the user can pull the casing 40 away from the optical fiber connector, the restoring force of the elastic member 25 drives the winding portion 20 and the cleaning portion 10 to move in a direction opposite to the direction that the driving portion 30 previous moves, thus, the protruding portion 321 moves back along the spiral shaped guide groove 123 to the initial position.

In this embodiment, the cleaning device 100 can further include an attaching element 50. The attaching element 50 can be substantially a hollow cylinder. When the cleaning device 100 needs to clean a male connector, the attaching element 50 can be wrapped around the sleeve 11, thus the male connector to be cleaned can be inserted between the sleeve 11 and the attaching element 50. When the cleaning device 100 needs to clean a female connector, the attaching element 50 can be omitted.

It can be easily understand that the cleaning device 100 not only can clean the optical fiber connector, but also can clean any other small elements or small devices.

The embodiments shown and described above are only examples. Many further details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:
1. A cleaning device comprising:
    a cleaning portion comprising a cleaning head, a spiral shaped guide groove being defined along an outside surface of the cleaning head; and
    a driving portion comprising a protruding portion, wherein the protruding portion is movably received in the spiral shaped guide groove;

wherein when the cleaning head resists an object to be cleaned, and the driving portion is pushed to move toward the object to be cleaned, the protruding portion slides along the spiral shaped guide groove to drive the cleaning head to rotate to clean the object to be cleaned;

wherein the cleaning portion further comprises a sleeve and a cleaning line, a first through hole is formed in the sleeve along an axis direction of the sleeve, the cleaning head is received in the sleeve, a second through hole and a third through hole are parallelly defined in the cleaning head; two ends of the cleaning line are respectively inserted into a top end of the second through hole and a top end of the third through hole, and the two ends of the cleaning line respectively extend out of a bottom end of the second through hole and a bottom end off the third through hole; the cleaning device further comprises a winding portion to transmit the cleaning line; the winding portion comprises a first winding member and a second winding member; the two ends of the cleaning line are respectively wound on the first winding member and the second winding member; when the first winding member and the second winding member rotates, the cleaning line can be wound or released on the first winding member and the second winding member.

2. The cleaning device of claim 1, wherein the winding portion further comprises a support, the support comprises a vertical member and two horizontal members; the second winding member comprises a rod and a gear, the rod is connected between the gear and the vertical member; the driving portion further comprises a first guide groove, the first guide groove defines a plurality of engaging teeth; the gear is received in the first guide groove and engages with the engaging teeth, when the driving portion moves toward the object to be cleaned, the engaging teeth moves related to the gear and drives the gear to rotate; the rotation of the gear drives the rod to rotate to wind one end of the cleaning line.

3. The cleaning device of claim 2, wherein the winding portion further comprises a fixing member connected to the first winding member and the gear; the driving portion further comprises a second guide groove defined in the first guide groove, the fixing member is received in the second guide groove.

4. The cleaning device of claim 2, wherein a bottom of the sleeve is fixed to a top horizontal member of the two horizontal members, the bottom of the sleeve further defines an opening, the protruding portion extends through the opening to insert into the spiral shaped guide groove.

5. The cleaning device of claim 2, wherein the winding portion further comprises an elastic member, a first end of the elastic member is connected to a bottom horizontal member of the two horizontal members; the driving portion further comprises a base, a second end of the elastic member is connected to the base.

6. The cleaning device of claim 2, further comprising a casing, the cleaning portion, the winding portion, and the driving portion are received in the casing; a hole is defined in the casing, the cleaning head extends out of the casing via the hole.

7. The cleaning device of claim 1, further comprising an attaching element, the attaching element is substantially a hollow cylinder, when the cleaning device needs to clean a male connector, the attaching element is capable of being wrapped around the sleeve.

\* \* \* \* \*